US012352096B2

(12) United States Patent
Kiko

(10) Patent No.: US 12,352,096 B2
(45) Date of Patent: Jul. 8, 2025

(54) OVERHEAD DOOR SAFETY SUPPORT

(71) Applicant: Steve Kiko, North Lawrence, OH (US)

(72) Inventor: Steve Kiko, North Lawrence, OH (US)

( * ) Notice: Subject to any disclaimer, the term of this patent is extended or adjusted under 35 U.S.C. 154(b) by 160 days.

(21) Appl. No.: 18/174,317

(22) Filed: Feb. 24, 2023

(65) Prior Publication Data

US 2024/0011342 A1 Jan. 11, 2024

Related U.S. Application Data

(60) Provisional application No. 63/358,357, filed on Jul. 5, 2022.

(51) Int. Cl.
*E05F 5/00* (2017.01)

(52) U.S. Cl.
CPC ......... *E05F 5/003* (2013.01); *E05Y 2201/224* (2013.01); *E05Y 2600/45* (2013.01); *E05Y 2800/404* (2013.01); *E05Y 2900/106* (2013.01)

(58) Field of Classification Search
CPC ........ E05F 5/003; E05C 17/04; E05C 17/045; E05C 17/047; E05C 17/12; E05C 17/32; E05D 13/003
USPC ............................................................ 49/322
See application file for complete search history.

(56) References Cited

U.S. PATENT DOCUMENTS

| | | | | | |
|---|---|---|---|---|---|
| 3,258,062 | A * | 6/1966 | Lambert | E05D 13/003 | 292/230 |
| 3,894,761 | A * | 7/1975 | Brennan, Jr. | E05D 13/04 | 292/225 |
| 4,580,423 | A * | 4/1986 | Craig | E05B 63/0017 | 70/151 R |
| 4,638,433 | A * | 1/1987 | Schindler | G07C 9/00817 | 318/264 |
| 6,039,106 | A * | 3/2000 | Gontarski | E05D 15/165 | 292/228 |
| 6,326,751 | B1 * | 12/2001 | Mullet | E05F 15/686 | 318/434 |
| 6,417,770 | B1 * | 7/2002 | Sturznickel | E05C 17/047 | 200/61.93 |
| 2002/0109359 | A1 * | 8/2002 | Nodorft | E05B 47/026 | 292/137 |
| 2016/0083990 | A1 * | 3/2016 | Ricks | E05D 11/00 | 16/223 |
| 2024/0200376 | A1 * | 6/2024 | Lee | E05C 17/54 | |

* cited by examiner

*Primary Examiner* — Gregory J Strimbu
(74) *Attorney, Agent, or Firm* — Brennan, Manna & Diamond, LLC

(57) ABSTRACT

An overhead door safety support for overhead garage doors. The overhead door safety support includes a metal frame arm, a limit switch, a mounting assembly, a junction box, a spring-loaded garage door receiving piece, a plurality of hinges, a hand lock, and a stabilizing foot. The overhead door safety support is configured to prevent a garage door from unintentionally closing and provides a visual indication of a safe condition of the garage door.

10 Claims, 5 Drawing Sheets

OVERHEAD DOOR SAFETY SUPPORT

CROSS-REFERENCE TO RELATED APPLICATION

The present application claims priority to, and the benefit of, U.S. Provisional Application No. 63/358,357, which was filed on Jul. 5, 2022, and is incorporated herein by reference in its entirety.

FIELD OF THE INVENTION

The present invention relates generally to a new and improved overhead door safety support and/or kit for use with overhead garage doors, particularly those used in a commercial or industrial setting. More specifically, the invention relates to an overhead door safety support that is comprised of a metal frame arm, a level arm switch, a mounting assembly, a junction box, a spring-loaded garage door receiving piece, a plurality of hinges, a hand lock, and a stabilizing foot. Accordingly, the present specification makes specific reference thereto. However, it is to be appreciated that aspects of the present invention are also equally amenable to other like applications, devices and methods of manufacture.

BACKGROUND

In a commercial/industrial building, large overhead garage doors are commonplace. Said overhead garage doors facilitate various shipments, goods, vehicles, personnel, etc. to enter and exit the building efficiently. The overhead garage doors are typically comprised of steel, aluminum, glass, wood, or the like, and can reach up to 15 feet in height and weigh several hundred pounds.

After being secured to an entrance of a building, many garage doors are susceptible to damage that can be caused by several factors, with the foremost being forklifts coming into contact with the door. In a workplace setting, forklift drivers sometimes forget to look above their load for clearance when moving freight/goods. Therefore, most types of overhead garage doors are at risk for damage from forklift/freight collisions if the overhead garage door is occupying the ceiling headroom when opened. Such collisions can result in not only damage to the overall door, thereby rendering it inoperable or in need of replacement, but may also damage the forklift, the freight being transported by the forklift, and/or the forklift operator.

Overhead garage doors are also at risk for damage and to cause damage given the operational parameters unique to their specific construction. For example, free-falling "rolling" garage doors are typically controlled via a motorized opening/closing system, or a chain/hand crank/push-up operation. Since rolling doors are typically made with heavier gauge steel and built to be durable, they inherently weigh more. This creates an increase for any potential harm the door could cause if said door fails, as the increased weight would lead to a greater force being applied to any person or anything immediately below the door when it fails.

Similarly, sectional garage doors are typically comprised of many parts that need to be regularly lubricated. With constant exposure to the elements, which would be present as the door is open to the outside regularly, rust and corrosion can occur. Without proper maintenance and care, said rust and corrosion can lead to cables fraying, springs breaking or a variety of other part issues that can lead to overall door failure and/or a possible door free fall. Overall, equipment and human error can also lead to damage to the components of an overhead garage door, which can also include the breaking/damaging of components of the door that occur on their own accord.

In the event of a garage door failure, said failure can be extremely dangerous. A 2007 NEISS Hospital Study found that more than 13,000 people suffer injuries as a result of garage door accidents every year, and this estimate, adjusted for present day, produces a figure at or around 20,000 injuries per year. In response, most existing overhead garage doors are equipped with some form of safety measure to prevent the garage door from closing unexpectedly from the raised or opened position.

In an effort to prevent the occurrence of a garage door failure and/or injury, a number of safety devices currently exist today for garage door applications. However, such safety devices contain a number of inherent limitations due to their design and/or operation. By way of example, current garage door safety features are typically comprised of a pair of infrared transmitter and receiver sensors that are placed on each side of the door opening and facing one another. This creates an infrared beam that travels from the transmitter sensor to the receiver sensor, and if the beam is broken or otherwise interfered with (e.g., by a person walking through the garage door, thereby interrupting the beam with their legs/feet), the safety device will not allow the overhead garage door to close, and will cease the closing operation if it is occurring at the time the beam is interrupted. However, these types of safety devices are fully dependent on the existing means to raise/lower the garage door. In the event of a failure in one of the means (e.g., a component, motor, cable, spring, etc.), the current infrared safety devices are not able to physically prevent the garage door from quickly falling, thereby doing nothing to mitigate or prevent severe injury or damage to an individual or object positioned beneath the door when it falls.

Therefore, there exists a long-felt need in the art for an improved overhead door safety support that prevents a garage door from falling and that is capable of physically stopping a garage door from continuing to fall once said garage door has failed. There also exists a long-felt need in the art for an overhead door safety support that can quickly and easily be moved in and out of position from under the garage door when in use/not in use. Finally, there exists a long-felt need in the art for an improved overhead door safety support and/or kit that, in addition to being capable of physically stopping a falling garage door, is comprised of a safety means to indicate to users when it is safe to travel underneath an opened overhead garage door.

In one exemplary embodiment, the present invention discloses an improved overhead door safety support kit. The improved overhead door safety support is preferably comprised of a frame arm, a level arm switch, a mounting assembly, a junction box, a spring-loaded garage door receiving piece, a plurality of hinges, a hand lock, and a stabilizing foot. More specifically, the frame arm of the device provides a means to physically stop a garage door from closing and is easily repositionable between a first or engaged position and a second or disengaged position. The junction box is in electrical communication with the receiving piece that is capable of subsequently illuminating either a red or green light to indicate to individuals that it is safe or is not safe to travel underneath the overhead garage door. In addition, the mounting assembly/hinges of the kit allow the frame arm to be secured to the structure and easily pivoted from the first position to the second position, and vice versa.

In this manner, the improved garage safety device of the present invention accomplishes all of the forgoing objectives, thereby providing a means to ensure and physically stop an overhead garage door from falling or unintentionally closing. In addition, the device can quickly and easily be maneuvered out from under the garage door's path of travel when not in use. Finally, the device provides a visual means to indicate whether it is safe for an individual to pass through/under an opened overhead garage door.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises an improved overhead door safety support. More specifically, the device is comprised of a repositionable frame arm, a limit switch, a mounting assembly, a junction box, a spring-loaded garage door receiving piece, a plurality of hinges, a hand lock, and a stabilizing foot. The frame arm of the device attaches to a garage door track via the mounting assembly, which is further comprised of a hinge and a clamp. It is contemplated that in a preferred embodiment of the device, each device has at least two mounting assemblies, although differing embodiments may have more or less than two mounting assemblies. The mounting assembly attaches to the frame arm via a hinge, which allows the device to articulate out from underneath a garage door when not in use (e.g., when in a stored position). The first or upper end of the frame arm is also comprised of a spring-loaded garage door receiver piece. The receiver piece protects a garage door and helps reduce the impact if the garage door falls on the device.

When the safety arms are not extended, the LED light will be "RED" to indicate that it is not safe to walk under the garage door. When the safety arms are extended all the way under the garage door, the LED light will turn "GREEN" to indicate that it is safe to walk under the garage door.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is not intended to include all such aspects and their equivalents. Other advantages and novel features will become apparent from the following detailed description when considered in conjunction with the drawings.

DETAILED DESCRIPTION

Figure 1:
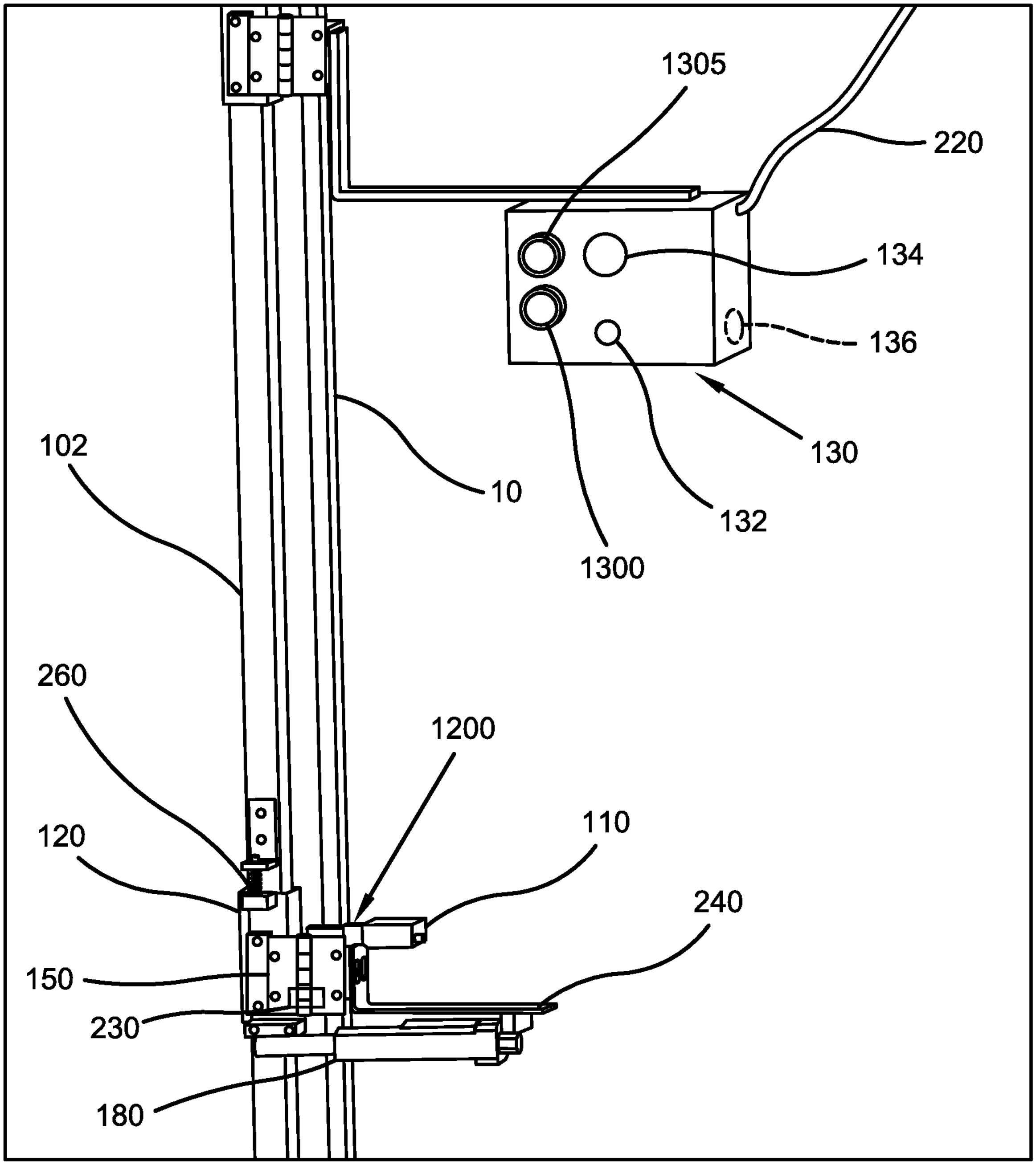
FIG. 1 illustrates a perspective view of one potential embodiment of the overhead door safety support of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As noted above, there exists a long-felt need in the art for an improved overhead door safety support that is capable of physically stopping a garage door from continuing to fall once said door has failed, and that also ensures that an opened overhead garage door cannot be unintentionally closed. There also exists in the art a long-felt need for an overhead door safety support that can quickly and easily be moved in and out from underneath an opened overhead garage door. Finally, there exists a long-felt need in the art for an improved overhead door safety support that, in addition to being capable of physically stopping an opened overhead garage door from closing or falling, is comprised of a visual safety means to indicate to users when it is safe to travel underneath the opened overhead garage door.

The present invention in one embodiment is comprised of a frame arm, a limit switch, a mounting assembly, a junction box, a spring-loaded garage door receiving piece, a plurality of hinges, a hand lock, and a stabilizing foot. It is also contemplated that in differing embodiments of the device, said device may be in the form of a kit that is further comprised of a wiring system to allow a user to wire the existing garage door controls to the junction box of the device, and a pair of frame arms that can be positioned on each side of the opened overhead garage door.

Referring initially to the drawings, FIG. 1 illustrates a perspective view of one potential embodiment of the overhead door safety support 100 of the present invention. The overhead door safety support 100 is preferably comprised of at least one frame arm 102, at least one limit switch 110, at least one mounting assembly 120, at least one junction box 130, at least one spring-loaded receiving piece 140, at least one hinge 150, and at least one stabilizing foot 170. More specifically, the frame arm 102 of the safety device 100 is preferably comprised of an elongated beam having a first end 103 and an opposing second end 105. However, the frame arm 102 may be any shape of beam or member in any embodiment. In one embodiment, the frame arm 102 is manufactured from steel or other durable metal material and is approximately 10 feet in length, although the exact material and length of the frame arm 102 may vary in different embodiments. In other embodiments, the frame arm 102 may be a continuous tubular section or may have a plurality of separable sections that can be assembled and secured together via at least one fastener 200. The fastener 200 may be any fastener known in the art such as a bolt, a screw, a bracket, a clip, a pin, etc. In one embodiment, the frame arm 102 may include at least one spring 260, such as, but not limited to, a die spring. The fastener 200 is preferably a clevis pin. The first end 103 of the frame arm 102 is further comprised of at least one spring-loaded garage door receiving piece 140. The spring-loaded garage door receiving piece 140 serves as a stop in the event that the garage door falls/fails.

The junction box 130 is preferably comprised of at least one LED light. In the preferred embodiment, the junction box 130 is comprised of a first colored LED light 1300 that is preferably, but not limited to, red and a second LED light 1305 that is preferably, but is not limited to, green. However, any other color and light may also be used. When at least one selector switch 134 or button is turned to activate at least one electric cylinder 180 that extends at least one safety arms 240 and activates at least one limit switch 110, the junction box 130 illuminates the green LED 1305 to indicate to any users nearby that the safety arms 240 are extended and in place. As a result, the garage door 20 under which the device 100 is installed is safe to walk under/through the garage doorway 22.

In contrast, when the device 100 is not positioned under a garage door 20 (and wherein the limit switch 110 is not activated) the junction box 130 illuminates the red LED 1300, thereby indicating that it is not safe to walk through the garage doorway 22 and under the suspended overhead garage door 20. In the preferred embodiment, the device 100 is comprised of at least one limit switch 110 per frame arm 102.

The junction box 130 may also be comprised of a means to integrate a garage door's existing controller 24 and existing infrared safety sensors 26 into said junction box 130 via a wiring kit 220 that may also be part of the device 100 in differing embodiments. This allows a user to also control the opening/closing of the door via at least one button 132 on the junction box 130.

Figure 2:
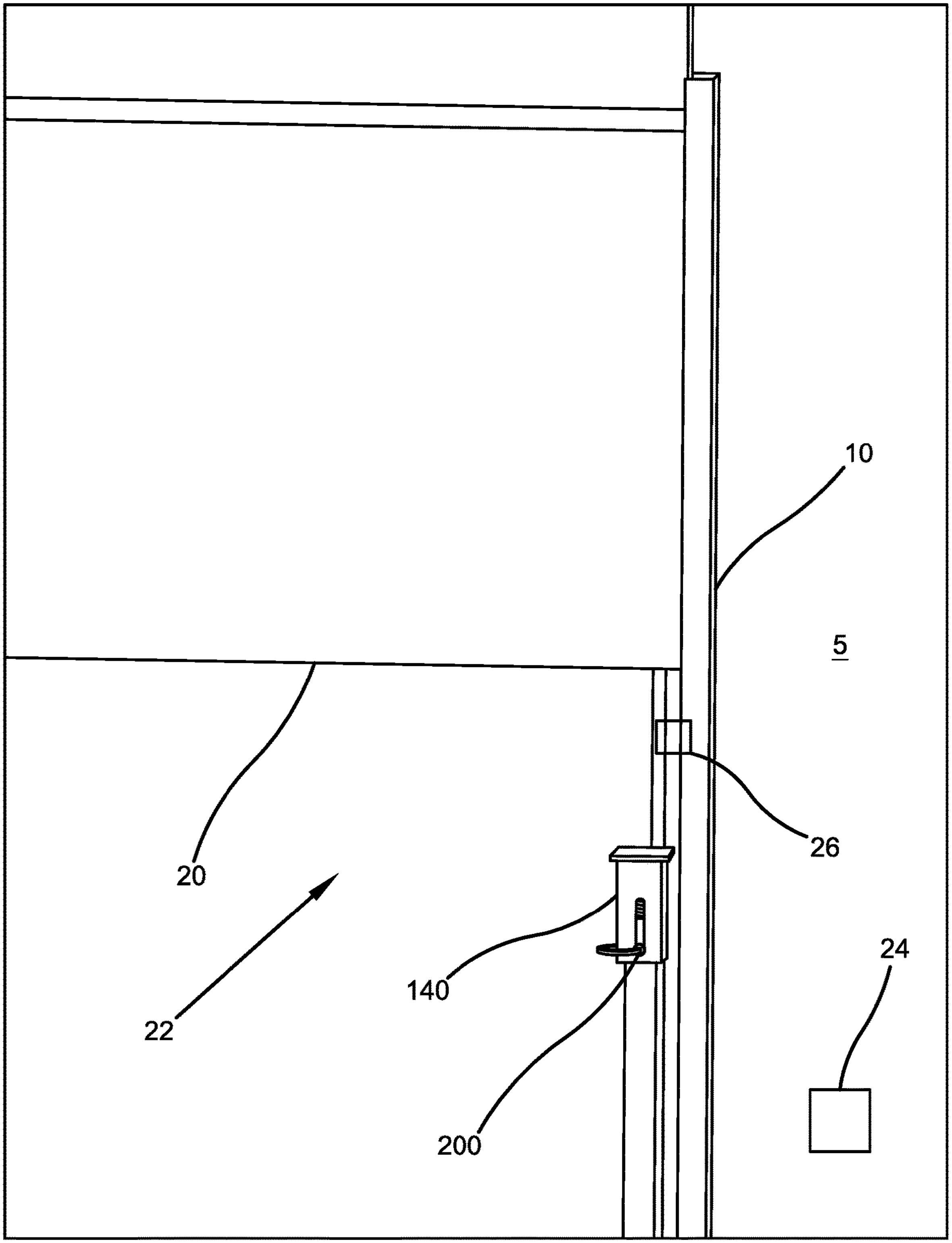
FIG. 2 illustrates a perspective view of one potential embodiment of the overhead door safety support of the present invention while attached under a garage door in accordance with the disclosed architecture.
Figure 3:
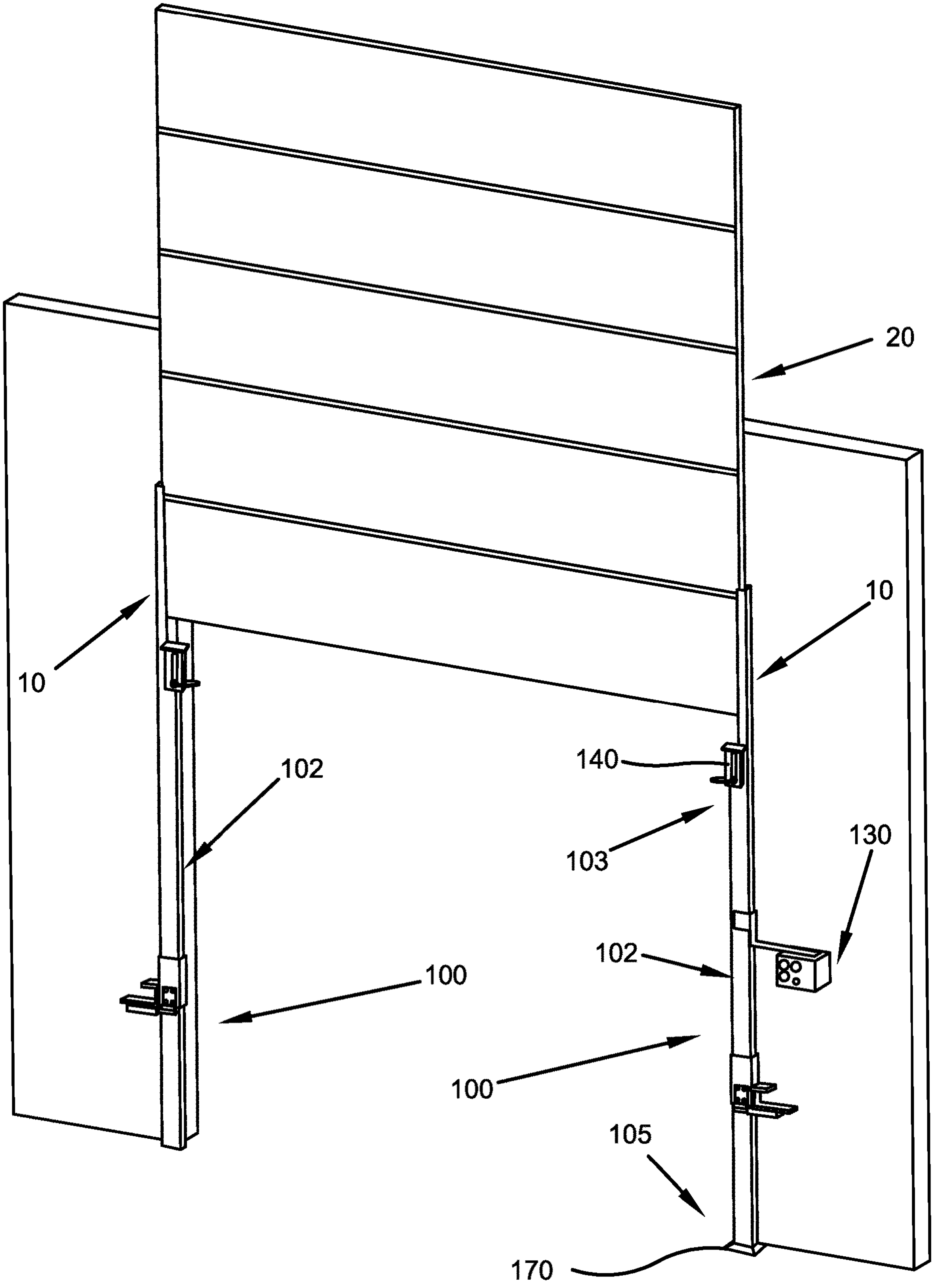
FIG. 3 illustrates an enhanced perspective view of one potential embodiment of two overhead door safety supports of the present invention while attached under a garage door in accordance with the disclosed architecture.

The mounting assembly 120 allows the device 100 to be mounted to a garage door track 10 on one or both sides of the garage door 20 and can be seen in FIG. 1, FIG. 2, and FIG. 3. The mounting assembly 120 is further comprised of at least one fastener 1200. The fastener 1200 is preferably a clamp that allows the mounting assembly 120 to attach to the track 10. In a preferred embodiment of the device 100, the device 100 is comprised of at least two mounting assemblies 120, although differing embodiments of the device 100 may have more or less than two mounting assemblies 120. It should also be noted that at least one arm pad (not shown) and at least one arm tap pad (not shown) allows for adjustability in regard to the distance the assembly 120 extends away from a wall 5, thereby allowing the device 100 to be used with various wall depths. In addition, the assembly 120 or at least one hinge 150 can be comprised of a hand lock 230 of any lock type known in the art to allow for each component 120/150 (or both) to be locked in the desired position.

FIG. 2 illustrates a perspective view of one embodiment of the garage safety device 100 of the present invention while supporting the garage door 20, and in which the attachment of the mounting assembly 120 to the garage door track 10 can be fully observed. Once secured to the garage door track 10 via the fastener 1200, the device 100 can articulate via a hinge 150 that is affixed to the frame arm 102. This hinge 150 allows the mounting assembly 120 and, in turn, the device 100, to articulate/swivel 180 degrees from a position that is relatively flush with the wall 5 (i.e., the stowed or disengaged position) on the exterior edge of the garage door 20 to a position directly underneath the bottom of the garage door 20 (i.e., the engaged position).

As previously stated, the device 100 of the present invention is also comprised of a stabilizing foot 170. The stabilizing foot 170 may be a plate-like structure positioned on the second end 105 of the frame arm 102 and immediately adjacent to a ground surface. The stabilizing foot 170 is useful for spreading the load of the device 100 and the weight of the garage door that it supports over a larger ground surface area and stabilizing the device in general. The stabilizing foot 170 may be permanently or removably attached to the second end 105 of the frame arm 102 by any means commonly known in the art such as welds, bolts, or other types of fasteners. In an alternative embodiment, it is also contemplated that the device 100 could comprise an electric motion cylinder 180 to move the arm in and out.

To install the device 100, a user can open a garage door 20 to roughly 6"-12" above the height of the device 100. This can be done either manually or with an automatic garage door opener 24 or button 132. Once the garage door 20 is above the device 100, the user can manually move the frame arms 102 into place and lock the arms 102 in place or automatically move the arms 102 in place by using at least one switch 134 or button on the junction box 130 (that is in electrical communication with the cylinder 180) provided until the closed limit switches 110 actuates and the green LED 1305 illuminates. The arm 102 is designed to mount directly to a 2" garage door track 10 but can also be custom designed for any garage door track/brackets known in the art. In the preferred embodiment of the device 100, the device 100 may come with two arms, one for each side of a garage door 20. The arms 102 are designed to go from a ground surface to the bottom of the garage door 20. This eliminates the possibility of the door 20 falling due to any mechanical/electrical failure. One embodiment of the device 100 may feature automatic safety arms 240 that are powered by the junction box 130 and have 24V components.

Figure 4:
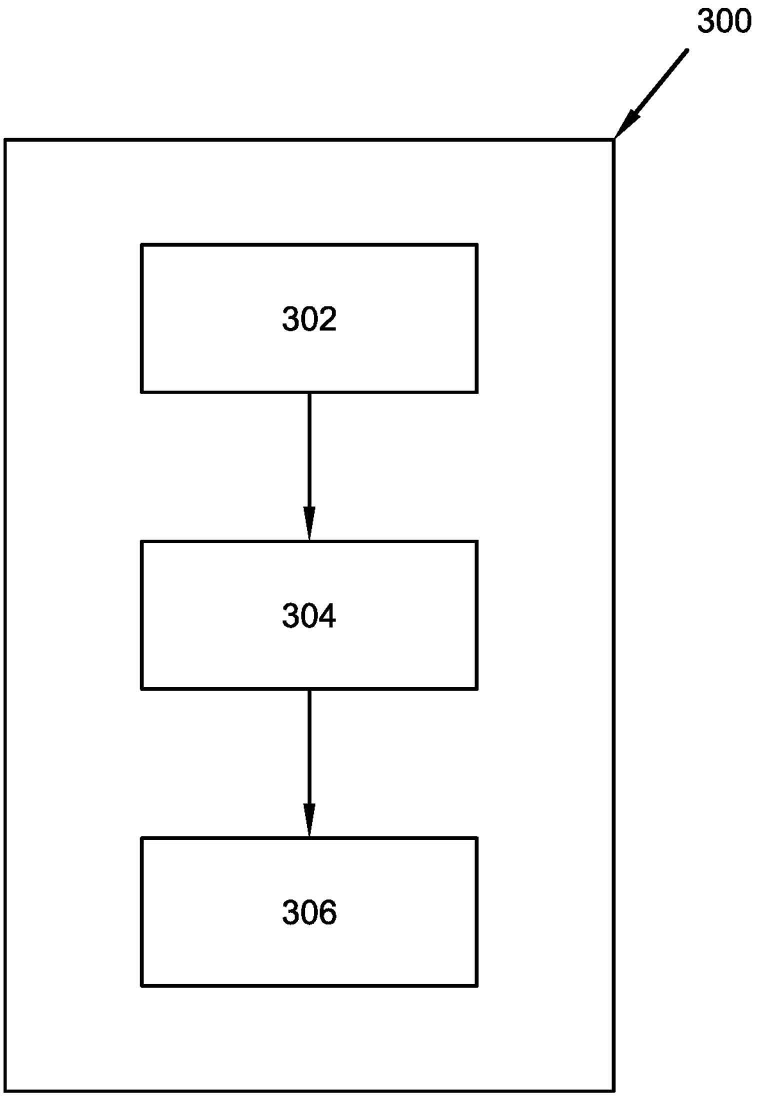
FIG. 4 illustrates a flowchart of a first method of using one potential embodiment of the overhead door safety support of the present invention in accordance with the disclosed architecture.

The device 100 may have at least two embodiments. The first embodiment is comprised of a manual version of the device 100 that contains no electric cylinder 180 and no junction box 130. To use this embodiment of the device 100, the device 100 has a first method of use 300, as seen in FIG. 4. A user first opens a garage door 20 (either manually or using a garage door opener 24) to roughly 6"-12" above the device 100 after the device 100 is placed in the doorway 22 under the door 20 [Step 302]. Then, a user can manually extend the arms 240 and lock the arms 240 into place via the lock 230 [Step 304]. Once the arms 240 are locked into place and under the garage door 20, it is now safe to walk under garage door 20, as the arms 240 will catch the door 20 if it fails and falls downward. To disengage the device 100, a user can unlock the lock 230 on the arm 240 and retract the device 100 into the stowed position [Step 306].

Figure 5:
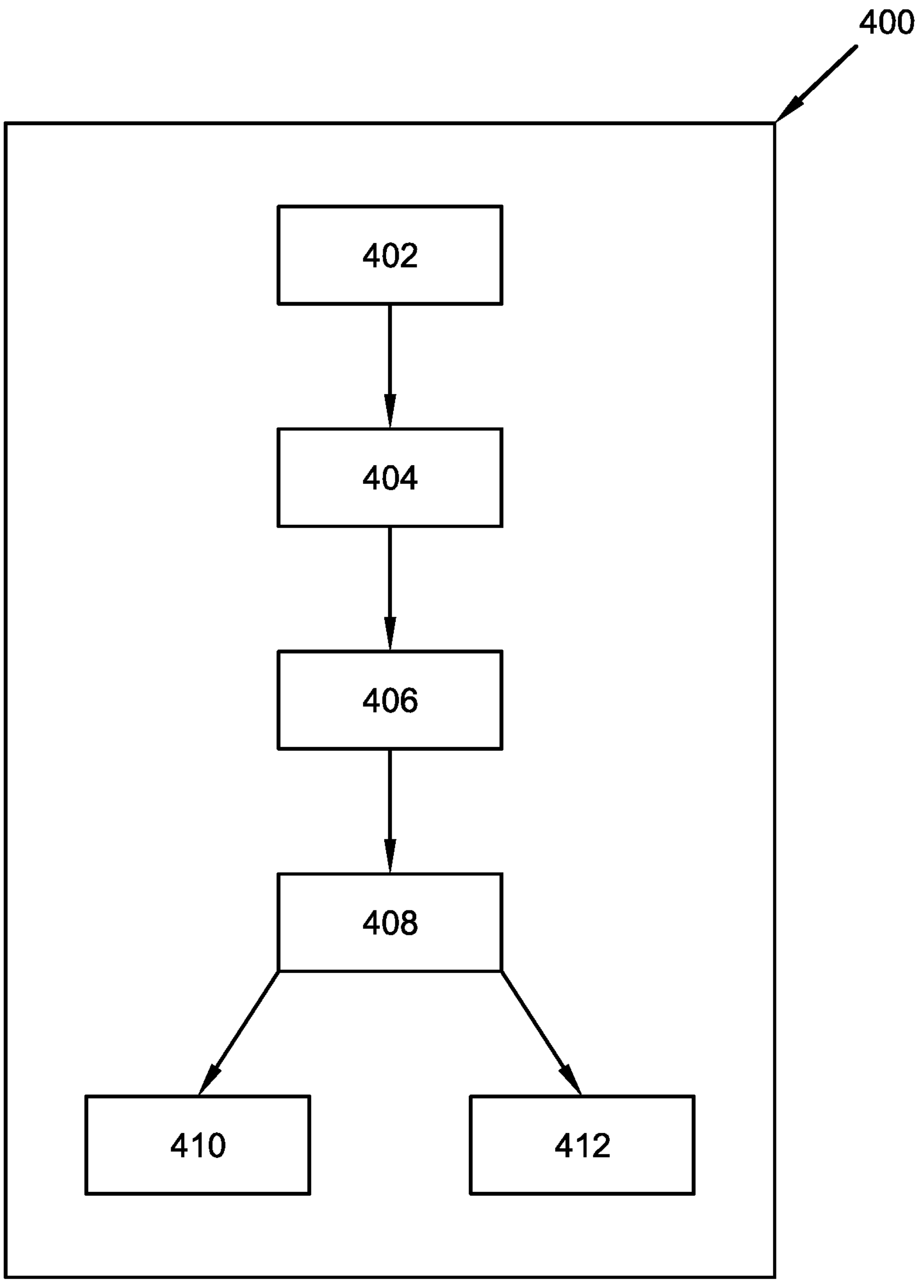
FIG. 5 illustrates a flowchart of a second method of using one potential embodiment of the overhead door safety support of the present invention in accordance with the disclosed architecture.

The second embodiment is comprised of a semi-automated version of the device 100 comprised of at least one electric cylinder 180 and at least one junction box 130 (human machine interface). To use this embodiment of the device 100, the device 100 has a second method of use 400, as seen in FIG. 5. A user first opens a garage door 20 (either manually or using a garage door opener 24) to roughly 6"-12" above the device 100 after the device 100 is placed in the doorway 22 under the door 20 [Step 402]. Then, a user can manually extend the arms 240 or automatically extend the arms 240 using the cylinder 180 via a switch 134 on a junction box 130 [Step 404]. Then, the arms 240 can be locked in place via the lock 230 [Step 406]. At this point, the limit switch 110 is activated such that the green LED 1305 is illuminated, thereby indicating it is safe to walk under the garage door [Step 408]. To disengage the device 100, the switch 134 can be used to retract the cylinders 180 and to retract the arms 240 until the red LED 1300 is illuminated [Step 410]. In a differing embodiment, the garage door controller 24 is in wireless electrical communication with at least one receiver 136 of the junction box 130 such that using the controller 24 to close the garage door 20 automatically retracts the cylinders 180 to retract the arms 240 [Step 412].

Notwithstanding the forgoing, the overhead door safety support 100 can be any suitable size, shape, and configuration as is known in the art without affecting the overall concept of the invention, provided that it accomplishes the above-stated objectives. One of ordinary skill in the art will appreciate that the shape and size of the device 100 and its various components, as shown in the FIGS. are for illustrative purposes only, and that many other shapes and sizes of the device 100 are well within the scope of the present disclosure. Although dimensions of the device 100 and its components (i.e., length, width, and height) are important design parameters for good performance, the device 100 may be any shape or size that ensures optimal performance during use and/or that suits user need and/or preference.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. An overhead door safety support comprising:

a frame arm;

a limit switch;

a mounting assembly comprising a hinge for rotatably securing the mounting assembly to the frame arm and comprising a locking element;

a first light;

a second light;

a junction box comprised of a control switch;

a spring-loaded receiving piece attached to one end of the frame arm;

an electrical cylinder; and a stabilizing foot; and wherein the frame arm is a tubular elongated beam.

2. The overhead door safety support of claim 1, wherein the first light is illuminated when the limit switch is activated.

3. The overhead door safety support of claim 1, wherein the second light is illuminated when the limit switch is not activated.

4. The overhead door safety support of claim 1, wherein the electrical cylinder is controlled by the control switch.

5. The overhead door safety support of claim 1, wherein the electrical cylinder is attached to the frame arm.

6. An overhead door safety support comprising:

a frame arm;

a limit switch;

a mounting assembly comprising a hinge for rotatably securing the mounting assembly to the frame arm and comprising a locking element;

a first light;

a second light;

a junction box comprised of a switch, a button, and a receiver;

a spring-loaded receiving piece;

an electrical cylinder; and a stabilizing foot; and wherein the locking element is configured to secure the mounting assembly in a rotated position.

7. The overhead door safety support of claim 6, wherein the receiver is in wireless electrical communication with a garage door controller.

8. The overhead door safety support of claim 6 further comprised of a wiring.

9. The overhead door safety support of claim 6, wherein the spring-loaded receiving piece is positioned at a first end of the frame arm.

10. The overhead door safety support of claim 6, wherein the stabilizing foot is positioned at a second end of the frame arm.

* * * * *